United States Patent [19]
Bilsback
[11] 3,828,215
[45] Aug. 6, 1974

[54] INTEGRATED PACKAGING ARRANGEMENT FOR GAS PANEL DISPLAY DEVICE

[75] Inventor: Malvin S. Bilsback, Woodstock, N.Y.
[73] Assignee: International Business Machines Corporation, Amonk, N.Y.

[22] Filed: June 30, 1972
[21] Appl. No.: 267,926

[52] U.S. Cl. .............. 313/50, 313/51, 317/101 CC, 339/17 D
[51] Int. Cl. .............................................. H01j 5/50
[58] Field of Search ................. 313/49, 50, 51, 188; 174/DIG. 3; 339/17 D, 17 F, 176 L, 17 LM, 17 MP; 317/101 C, 101 CC; 315/169 TV

[56] References Cited
UNITED STATES PATENTS

| | | | |
|---|---|---|---|
| 3,588,615 | 6/1971 | Brearly et al. | 317/101 CC |
| 3,597,660 | 8/1971 | Jensen et al. | 174/DIG. 3 |
| 3,605,063 | 9/1971 | Stewart | 339/17 LM X |
| 3,638,163 | 1/1972 | Loosme | 339/17 M |
| 3,683,105 | 8/1972 | Shamash et al. | 317/101 CC X |
| 3,684,918 | 8/1972 | Schmersal | 315/169 TV X |

*Primary Examiner*—Palmer C. Demeo
*Attorney, Agent, or Firm*—Ralph L. Thomas

[57] ABSTRACT

A display device includes a gas panel, at least one circuit board, and an interconnecting flexible sheet. The gas panel preferably includes a pair of glass plates fused together with a chamber therebetween filled with an illuminable gas. Parallel electrical conductors on one of the glass plates are disposed horizontally on one side of the illuminable gas, and parallel electrical conductors on the opposing glass plate are disposed vertically with the horizontal conductors being disposed orthogonally with respect to the vertical conductors. Conductors are disposed on the flexible sheet, and they are connected between electrical circuit components on the circuit board and the vertical and horizontal conductors of the gas panel. The gas panel and the one or more circuit boards may be secured together as a compact unit, or they may be separated to permit cooling air to flow therebetween in which event apertures may be provided in the flexible sheet to facilitate air flow.

15 Claims, 4 Drawing Figures

INTEGRATED PACKAGING ARRANGEMENT FOR GAS PANEL DISPLAY DEVICE

CROSS-REFERENCE TO RELATED APPLICATION

Application Ser. No. 214,348 filed on Dec. 30, 1971, for Gas Panel Fabrication by Peter H. Haberland, et al.

BACKGROUND OF THE INVENTION

1. This invention relates to the construction of electrical devices in general and more particularly to the construction of gas panel display devices.

2. The advent of computing devices created a demand for display devices which visually portray computational results for the benefit of an observer. Such display devices are needed for both general and special purpose computing devices. Many types of display devices are available which may be suitably employed, but the relative high cost tends to limit their widescale use. Gas panel display devices appear to be both efficient and reliable in operation, and their large scale use can be assured if the cost of construction and repair is nominal and if they can be adapted to many different types of equipment for various display purposes. Some types of equipment present restrictions on installation space and cooling rates for dissipating heat generated by electrical operating circuits. Gas panels inherently involve numerous interconnecting electrical circuits to provide signals from driving circuits to the numerous electrical parallel conductors of the gas panel. It is to these problems that the present invention is directed.

SUMMARY OF THE INVENTION

It is a feature of this invention to provide a gas panel display device which is efficient and reliable in operation and yet is relatively inexpensive to manufacture and maintain.

It is a feature of this invention to provide a gas panel display device the various parts of which may be secured together for compactness where installation space is restricted.

It is another feature of this invention to provide a display device the basic parts of which may be assembled in distinct planes which are separated for the circulation of cooling air where high heat dissipating is required.

It is a feature of this invention to provide a gas panel display device which includes a gas panel and one or more component or circuit boards interconnected by a flexible sheet of insulation material having electrical conductors disposed thereon whereby electrical signals from electrical circuit components on the one or more circuit boards are supplied to the gas panel for operational purposes.

It is a still further feature of this invention to provide a flexible sheet connecting two or more circuit boards thereby to provide electrical interconnections and yet permit variable spacing by adjusting the position of such circuit boards with respect to one another.

It is another feature of this invention to provide a flexible insulation sheet between circuit boards or other electrical devices, to provide electrical conductors on the flexible sheet for interconnecting the electrical devices, and to provide apertures in the flexible sheet to permit the flow of cooling air between such circuit boards or other electrical devices.

In one arrangement according to this invention a display device includes a gas panel, one or more circuit boards, a flexible insulation sheet interconnecting the gas panel with the one or more circuit boards. Conductors are disposed on the flexible sheet. The gas panel includes a pair of glass plates which are spaced apart a given distance and sealed around the periphery thereof to form a chamber therebetween which is filled with an illuminable gas. One set of parallel electrical conductors are disposed on one glass plate, and another set of parallel electrical conductors are disposed on the other glass plate with one set of the parallel electrical conductors being disposed orthogonally with respect to the other set of parallel electrical conductors. The electrical conductors on the flexible sheet are connected to the two sets of parallel electrical conductors of the gas panel. The electrical conductors on the flexible sheet are connected also to electrical circuit components mounted on the one or more circuit boards. Signals from the electrical circuit components are supplied through the conductors on the flexible sheet to operate the gas panel by selectively igniting, sustaining, or extinguishing gas cells which are defined as regions of the illuminable gas at the coordinate intersections of the two sets of parallel electrical conductors. The gas panel and the one or more circuit boards may be secured together to form a compact unit, or they may be separated from one to another to permit cooling air to pass therebetween. Apertures may be provided in the flexible sheet to facilitate the circulation of cooling air.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
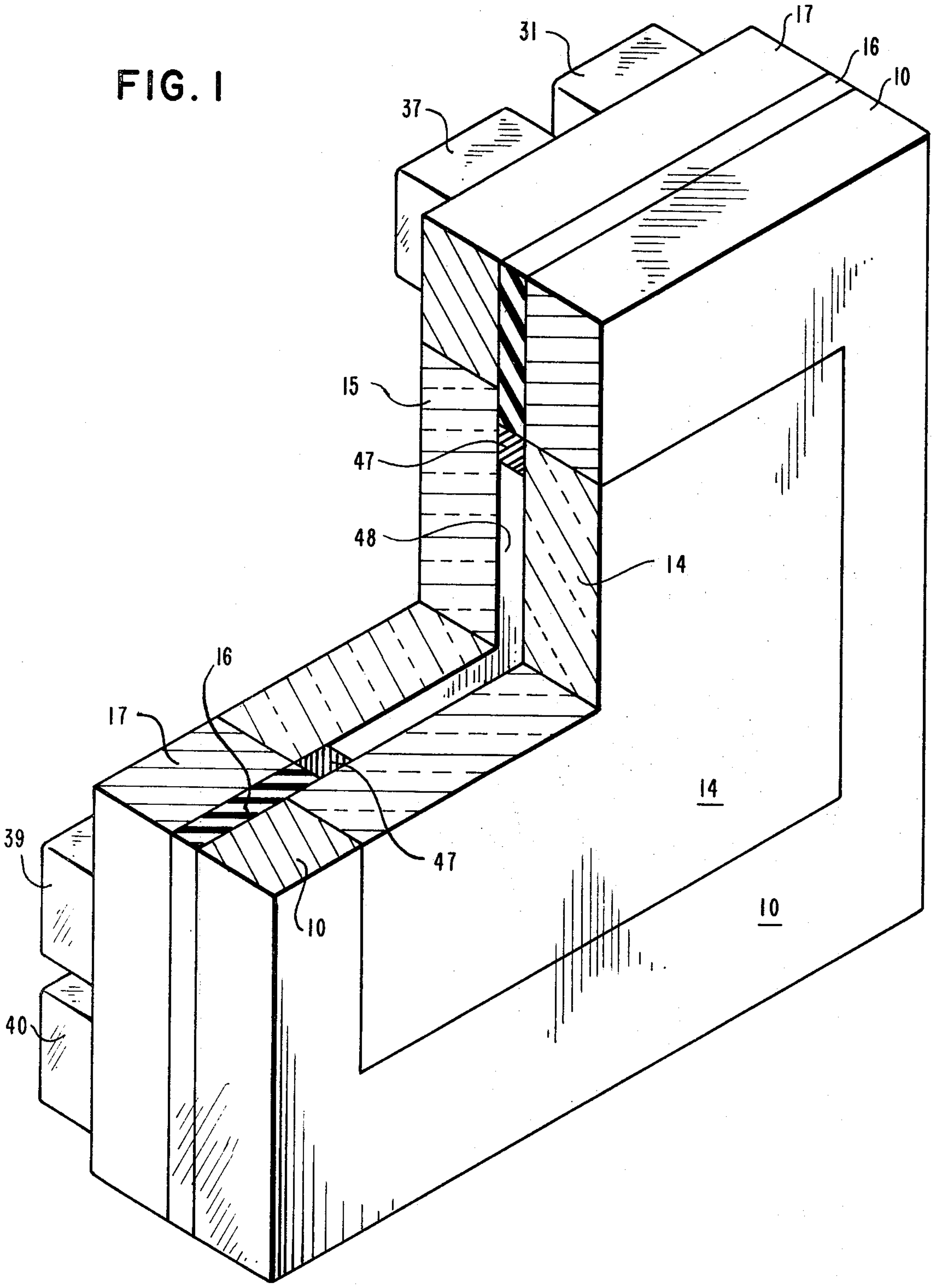
FIG. 1 is a perspective view which is cut away to illustrate a compact display device according to this invention.
Figure 2:
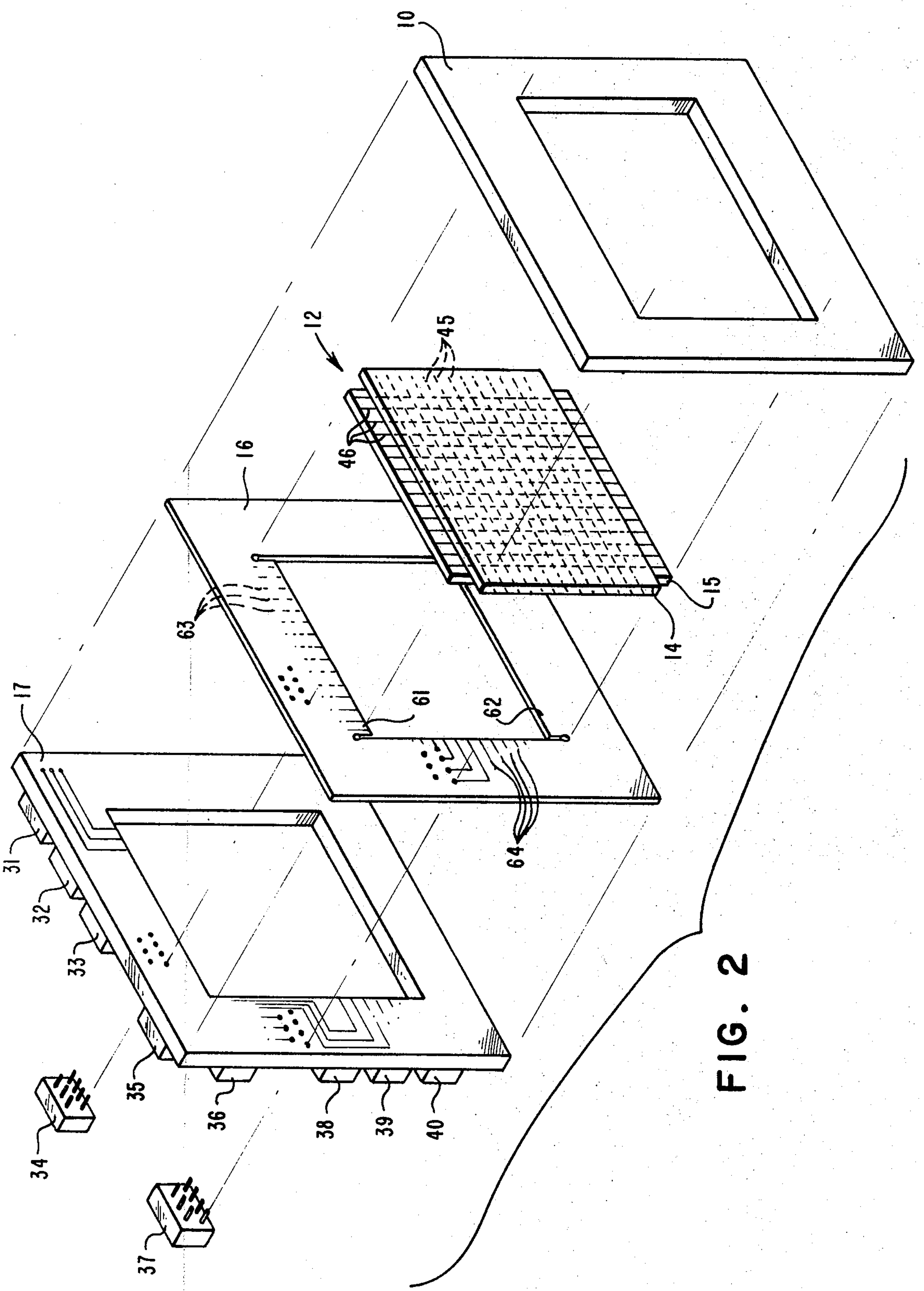
FIG. 2 is an exploded view of the device in FIG. 1.

Reference is made to FIGS. 1 and 2 which illustrate a display device according to this invention. FIG. 1 is a perspective view which shows the display device partly in cross section, and the parts are enlarged in the interest of clarity. FIG. 2 is an exploded view of the display device in FIG. 1. The same reference numerals are used in FIGS. 1 and 2 to designate corresponding parts. Referring more specifically to FIG. 2, the display device includes a retaining frame 10, a gas panel 12 composed of plates 14 and 15, a flexible sheet 16, and a component board 17. Electrical circuit components 31 through 40 are mounted on the backside of the component board 17. Additional electrical circuit components, not shown, may be mounted in other regions on the back side of the component board 17.

The gas panel 12 in FIG. 2 may be any one of various suitable types, and one such suitable arrangement is illustrated and described in copending application Ser. No. 214,348 filed on Dec. 30, 1971, for Gas Panel Fabrication by Peter H. Haberland, et al. The gas panel 12 in FIG. 2 may be fabricated by depositing parallel electrical conductors 45 on the backside of the glass plate 14 which serve as horizontal coordinate drive lines and by depositing parallel electrical conductors 46 on the front face of the glass plate 15 which serve as vertical coordinate drive lines. A protective coating, preferably glass, is disposed over the parallel lines on the rear face of the glass plate 14 and the forward face of the glass plate 15. The glass plates are spaced apart a given distance using glass spacer rods, for example, and a sealing material is disposed between the glass plates around the periphery thereof. The assembly is fired in an oven to seal the glass plates together with a chamber therebetween. Thereafter the chamber is evacuated and filled with an illuminable gas, and the ends of the parallel conductors 45 extending beyond the sides of the glass plate 15 are exposed so that electrical contact with companion or mating conductors may be made as explained more fully hereinafter. Likewise, the parallel conductors 46 extending beyond the sides of the glass plate 14 are exposed so that electrical contact may be made with companion or mating conductors likewise as explained more fully hereinafter. The sealing material around the common periphery of the glass plates 14 and 15 is illustrated by the reference numeral 47 in FIG. 1. A gas-filled chamber 48 is formed between the glass plates 14 and 15 as shown in FIG. 1.

An essential characteristic of the sheet 16 in FIG. 2 is its flexibility. Other desirable characteristics include nonflammability and high electrical resistance, preferably at least $10^{10}$ ohm-centimeters. It must be adhesive to copper conductors which are deposited thereon, and it must remain relatively non-hygroscopic. The flexible sheet 16 in FIG. 2 also must be able to withstand high temperatures, approximately 600° Farenheit, without melting or burning during the short period of soldering or other fusion operations. If an infrared heat source is used to fuse companion electrical conductors, then the flexible sheet 16 in FIG. 2 must include the further characteristic of being transparent to infrared frequencies. Furthermore, the flexible sheet 16 in FIG. 2 must maintain its mechanical and electrical properties during construction and in the operating environment. Polyimide film is one suitable material which has the foregoing properties. Kapton is a polyimide film which is commercially available. A polyimide film is a polymer which is defined generally by the following equation:

$$\left[-\mathrm{HN}-\overset{\overset{\mathrm{O}}{\|}}{\mathrm{C}}-\mathrm{R}-\underbrace{\overset{\overset{\mathrm{O}}{\|}}{\mathrm{C}}-\mathrm{NH}}_{\mathrm{IMIDE}}-\right]$$

A Kapton film less than 5 mils thick was found to be suitably flexible and yet rugged enough to provide the desirable characteristics outlined above.

The flexible sheet 16 in FIG. 2 has copper conductors disposed on its front face and its back face. The copper conductors on the back face of the flexible sheet 16 in FIG. 2 mate with the corresponding conductors on the front face of the component board 17. Conductive copper land patterns are provided on the front face of the component board 17, and they run vertically and horizontally as required to form interconnecting electrical paths with the electrical circuit components 31 through 40. The copper land patterns on the front face of the component board 17 are illustrated by a simple schematic, and it is understood that these patterns in practice are complex and intricate. The simplified illustration is made in the interest of simplicity. The flexible sheet 16 is provided with an upper tab 61 and a lower tab 62 as shown in FIG. 2. During construction operations the flexible sheet 16 is bonded to the component board 17. After this is done, the upper tab 61 is raised; the upper portion of the glass plate 15 is inserted through the opening in the flexible sheet 16; the tab or flap 61 is lowered against the forward face of the glass plate 15 disposed above the glass plate 14, and the exposed ends of the conductors 46 on the glass plate 15 engage corresponding conductors 63 disposed on the back face of the tab 61. In like fashion the tab 62 is pulled forward and downwardly as the lower portion of the glass plate 15 is inserted in the opening of the flexible sheet 16, and afterward the tab or flap 62 is released whereby the rear face of this flap engages that portion of the forward face of the glass plate 15 below the glass plate 14. Electrical conductors, not shown, on the rear face of the flap 62 engage the exposed conductors on the forward face of the glass plate 15 which lie below the glass plate 14. With the gas panel 12 thus inserted in the opening of the flexible sheet 16, as illustrated in FIG. 1, the exposed electrical conductors at each end of the rear face of the glass plate 14 engage corresponding conductors on the forward face of the flexible sheet 16. More specifically, the exposed conductors 45 on the back side of the glass plate 14 mate with corresponding conductors 64 on the forward face of the flexible sheet 16 in FIG. 2. In like fashion the exposed conductors 45 on that portion of the backside of the glass plate 14 extending to the right of the glass plate 15 engage electrical conductors, not shown, disposed on the forward face of the flexible sheet 16.

The conductive land patterns disposed on the forward face and the back face of the flexible sheet 16 may be formed by anyone of several known techniques. One suitable method includes depositing a layer of copper on each side of the flexible sheet 16. The resulting copper clad polyimide film is then etched in a fashion to provide interconnecting land patterns which convey signals from the mating conductors on the forward face of the component board 17 in FIG. 2 to the horizontal conductors 45 and the vertical conductors 46 of the gas panel 12. The polyimide film 16 in FIG. 2 may be bonded to the forward side of the component board 17 by any one of many known techniques. The component board 17 may be fabricated from any suitable type of rigid material which is electrically non conductive. The component board 17 for example, may be a rigid composition board which is pierced by drilling or punching. The electrical connectors may be disposed in the pierced regions of the composition board thereby to connect electrical components on the backside of the board 17 to the electrical land pattern on the forward face of the board 17. The electrical connectors may include socket arrangements to permit removal of the electrical components, as illustrated by the components 34 and 37 in FIG. 2, or they may be permanent connections if desired. The electrical components 31 through 40 may be mounted on the laminated board 17 in a conventional way and soldered to provide connections to the copper lands on the forward face of the circuit board 17. Suitable electrical connector devices are provided on the flexible sheet 16 in order to connect electrical conductors on the back side with electrical conductors on the front side. Such electrical connectors may include hollow cylindrical devices for receiving removable connectors such as the pins of the electrical components 34 and 37 in FIG. 2.

The aperture in the component board 17 is sufficient in size to receive the glass plate 15 in FIG. 2, and the aperture in the retaining frame 10 is sufficient in size to receive the glass plate 14. A snug fit is desirable in each case. The display devices in FIGS. 1 and 2 may be assembled by bonding the flexible sheet 16 to the component board 17. The tabs 61 and 62 are pulled forward, and the gas panel 12 is inserted in the apertures of the component board 17 and the flexible sheet 16 in the manner shown in FIG. 1. The tabs 61 and 62 are released to engage the exposed conductors 46 on the forward face of the glass plate 16 on the respective upper and lower ends thereof. The retaining frame 10 is then inserted over the glass plate 14 thereby to provide the compact rigid structure shown in FIG. 1. The rigid frames 10 and 17 may be tightly secured together by bonding the retaining frame 10 to the flexible sheet 16 or, alternatively, by mechanical fasteners. Electrical connection between the conductors of the gas panel 12, flexible sheet 16, and the component board 17 may be accomplished by the pressure of a snug fit and tight fastening arrangement. On the other hand, the electrical connection of the electrical conductors on the flexible sheet 16 with the electrical conductors on the component board 17 and the gas panel 12 may be made by soldering techniques. One set of abutting conductors in each case is tin lead plated beforehand, and then the soldering operation is performed by heating the abutting conductors with focused infrared rays, rolled hot water, or hot gas from a heat source.

Electrical signals from the circuit components 31 through 40 are supplied through electrical conductors disposed on the forward face of the component board 17 to mating conductors on the backside of the flexible sheet 16 to conductors on the forward face of the flexible sheet 16 to mating conductors 45 on the rear face of the glass plate 14. Electrical signals from the circuit components 31 through 40 are supplied to conductors on the forward face of the component board 17 through mating conductors on the back side of the flexible sheet 16 to mating conductors 46 on the forward face of the glass plate 15. The electrical signals supplied to the conductors 45 and 46 of the gas panel 12 are used to ignite, sustain, and extinguish the gas in the regions of the coordinate intersections of the lines 45 and 46. These regions are designated gas cells, and they may be selectively ignited, sustained, and extinguished for the purpose of storing, displaying, and erasing information. Thus it is seen that a simple yet efficient display device is provided by the rigid structure of FIGS. 1 and 2. This display device is efficient in operation as well as economical to construct and repair. It may be mounted in a small space since it is compact.

Figure 3:
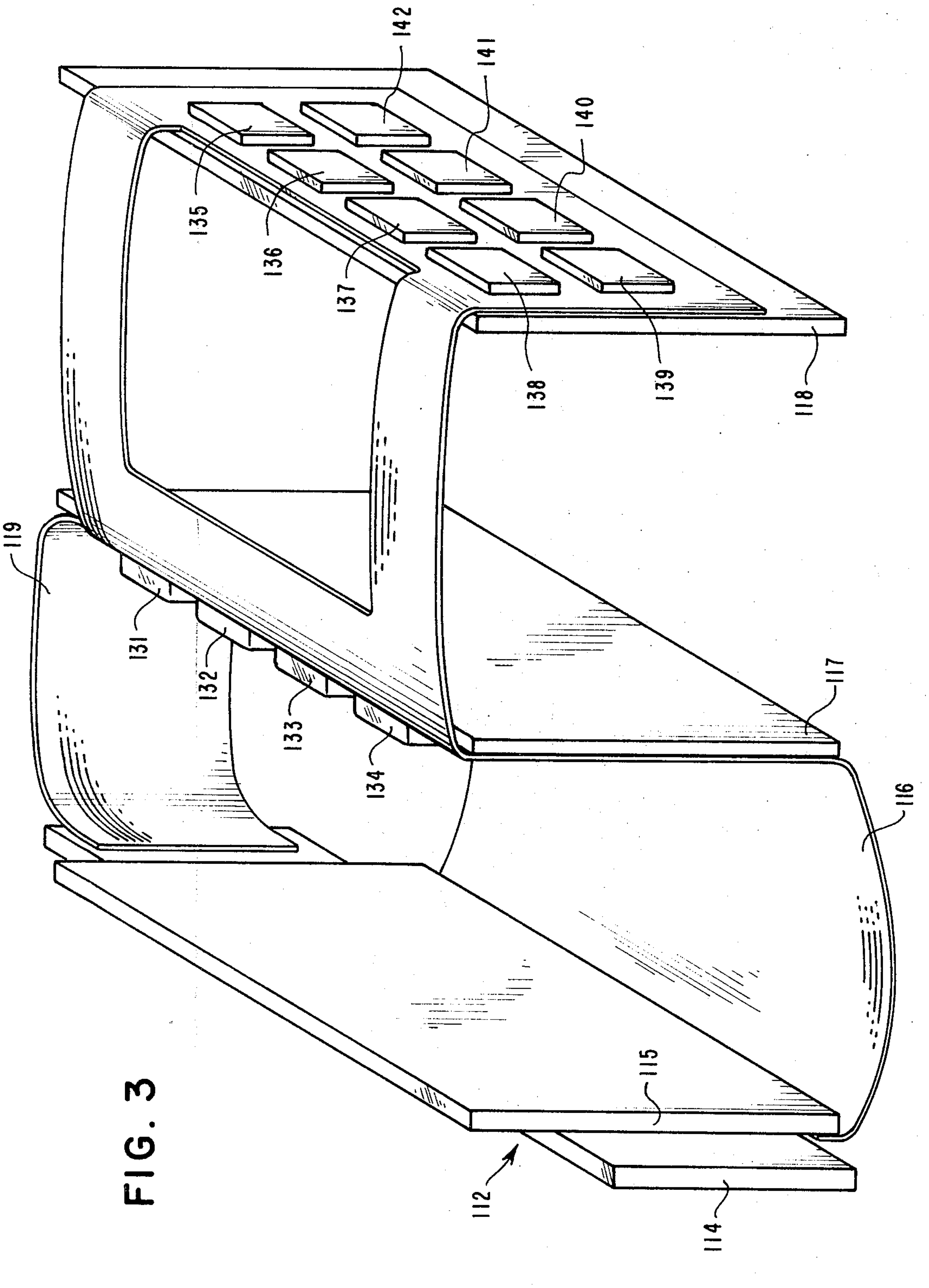
FIG. 3 is a perspective view of a display device illustrating another arrangement according to this invention.

Reference is made to FIG. 3 which illustrates another arrangement according to this invention. In this embodiment the display device includes a gas panel 112, composed of glass plates 114 and 115, and two component or circuit boards 117 and 118. A flexible insulation sheet 116 is connected to the lower forward face of the glass plate 115, and it extends over the circuit boards 117 and 118 as shown. The flexible sheet 116 preferably is bonded to the circuit boards 117 and 118. The flexible sheet 116 includes an integral strip 119 connected to the rear face of the glass plate 114 as shown. Electrical circuit components 131 through 134, and others not shown, are disposed on the forward face of the circuit board 117. Electrical circuit components 135 through 142 are disposed on the back face of the circuit board 118. Electrical conductors are disposed on the flexible sheet 116, the strip 119, the circuit board 117, and the circuit board 118 for the purpose of conveying electrical signals from the electrical circuit components 131 through 142 to the gas panel 112 in order to provide operating signals which selectively ignite, sustain, and extinguish the gas cells. Horizontal and vertical parallel conductors of the gas panel 112 are not shown in the interest of simplicity, and conductors on the flexible sheet 116 and the strip 119 merely are shown schematically for convenience.

The embodiment of FIG. 3 permits the component or circuit boards 117 and 118 to be placed selectively in different planes with respect to the gas panel 112. This is particularly useful as a packaging technique since the assembly may be mounted in a small space if necessary. If space is not restricted, then the assembly may be extended, as shown, to permit the flow of cooling air where a large quantity of heat must be removed from the electrical circuit components 131 through 142. An aperture is provided in the flexible sheet between the circuit boards 117 and 118 to permit easy access of cooling air. Additional circuit boards may be provided if required. In this event the flexible sheet 116 is extended and bonded to each such additional circuit board.

Figure 4:
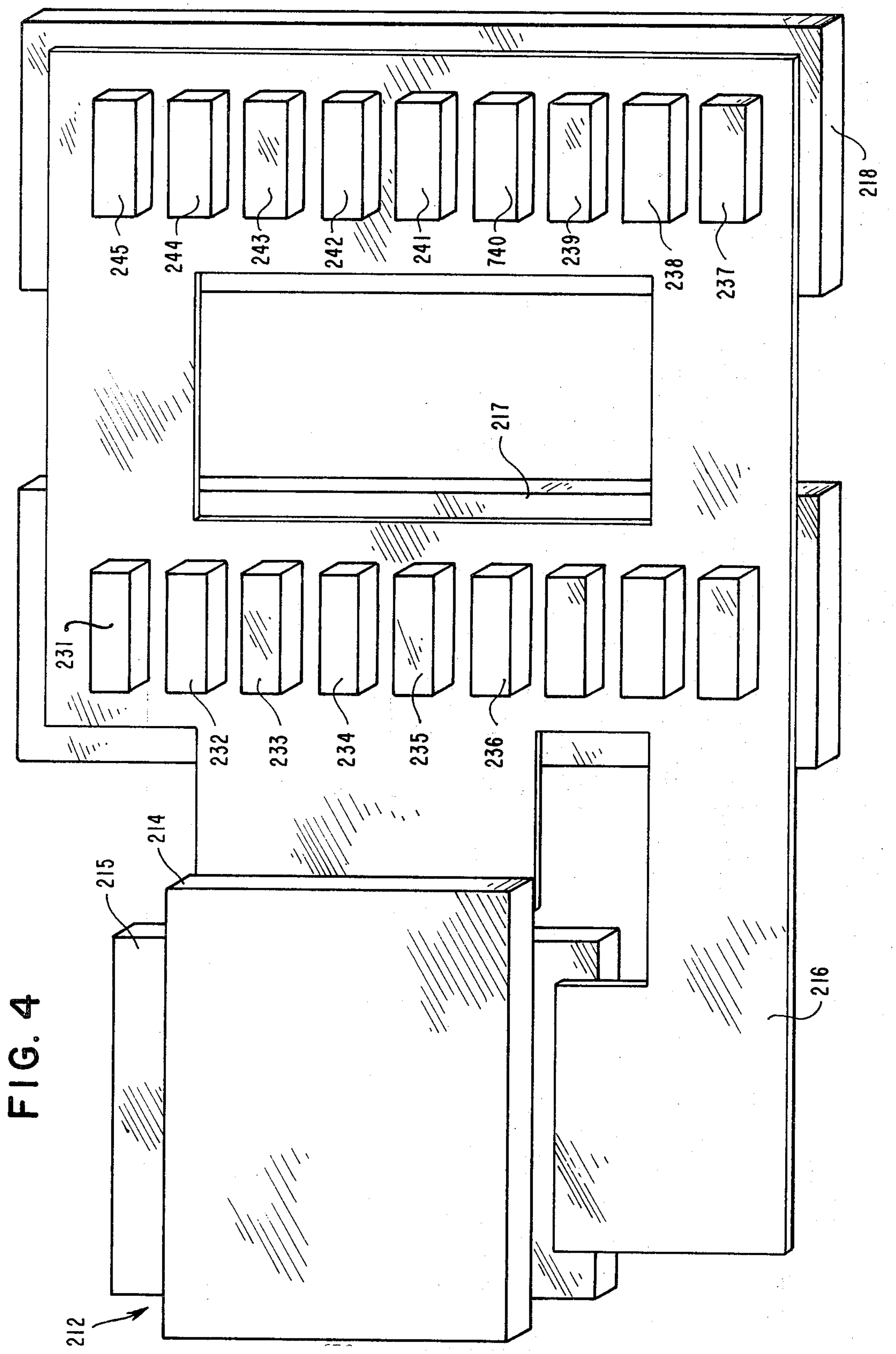
FIG. 4 is a perspective view of a display device illustrating a further arrangement according to this invention.

FIG. 4 illustrates a further modification of a display device where the entire assembly is disposed in a common plane. A gas panel 212 includes glass plates 214 and 215. A flexible sheet 216 is cut in the configuration shown, and it is bonded to circuit boards 217 and 218. Electrical conductors, not shown, are disposed on the flexible sheet 216. In practice, the network of electrical conductors is intricate and complex. Vertical and horizontal conductors, not shown, of the gas panel 12 are connected to conductors on the flexible sheet 216, and electrical operating signals from the electrical circuit components 231 through 245 are applied to the gas panel 12. An aperture is provided in the flexible sheet 216 between the circuit boards 217 and 218 to permit easy flow of cooling air. If heat dissipation is not a problem, this aperture may be omitted. The arrangement in FIG. 4 permits the entire assembly to be disposed in a common plane should this be desirable. On the other hand, the flexible sheet 216 permits the gas panel 212, the circuit board 217, and the circuit board 218 to be disposed upright in the same manner as the display device shown in FIG. 3 should this be desirable to meet packaging requirements. Alternatively, the gas panel 212, the circuit board 217 and the circuit board 218 may be disposed at different angles with respect to each other should this be desirable, and it is not essential that they lie either horizontally or upright. An intermediate angular position may be desirable in some instances in order to place the gas panel and circuit boards somewhat close together and yet permit cooling air to flow therebetween. For example, the circuit boards 217 and 218 may be disposed upwardly at 45 degree angles while the gas panel 212 may be disposed at any desired angle for viewing purposes.

It should be pointed out that gas panels may have something on the order of 50 parallel lines per inch. It is readily seen that a gas panel of moderate size may have hundreds or even thousands of parallel electrical conductors disposed horizontally and vertically. The electrical driving circuits may be composed of integrated circuits each of which is rather small, but a large number of such circuits nevertheless may require cooling air to dissipate the heat generated from the operation of the display device. A display device is needed for many types of equipment, and very often very little space is allotted for its installation. The embodiment of FIG. 1 is desirable where allotted space is a minimum and heat dissipating is nominal. If heat dissipation from electrical components presents a problem, the embodiments of FIGS. 3 and 4 permit the circulation of cooling air for the purpose of heat removal with only a nominal increase in the space allotment for installation. Thus it is seen that a display device is provided which is efficient, simple in construction, and hence economical to manufacture and maintain. Moreover, the display device may be installed in a relatively small space, and cooling air may be circulated in many types of equipment without requiring additional installation space. If cooling air must provide a high rate of heat dissipation from electrical components, then apertures in the flexible sheet permit adequate flow of cooling air by the slight separation of the gas panel and the component or circuit boards with a modest increase of installation space.

The display device of FIG. 1 may be mounted by brackets or other suitable holder arrangement in electrical equipment. The required installation space is minimal. Suitable mounting arrangements for the display devices in FIGS. 3 and 4 may include a chassis or combination of brackets to permit the gas panel and component boards to be placed in any one of a number of positions with respect to each other. Such chassis or bracket arrangement is not shown in the interest of simplicity. The display devices of FIGS. 3 and 4 require more installation space then that of FIG. 1 because the gas panel and component boards are spaced apart. Since the space between the gas panel and the component boards may be varied in the embodiments of FIGS. 3 and 4, the installation space varies accordingly.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A display device comprising:

a gas panel, including first and second glass plates bonded together with a chamber therebetween filled with an illuminable gas, a first plurality of parallel electrical conductors disposed on the first glass plate, a second plurality of parallel electrical conductors disposed on the second glass plate, said first and second plurality of parallel electrical coonductors being disposed orthogonally with respect to each other, a flexible sheet of insulation material, a third plurality of electrical conductors disposed on one side of said flexible sheet, a fourth plurality of electrical conductors disposed on the opposite side of said flexible sheet, electrical connector means connecting selected ones of said third plurality of electrical conductors with selected ones of said fourth plurality of conductors, a component board, a fifth plurality of electrical conductors disposed on said component board, means bonding the flexible sheet and said component board together with said third plurality of electrical conductors making electrical contact with a given number of said fifth plurality of electrical conductors on said component board, electrical circuit components mounted on said component board, means connecting the electrical components to given ones of said fifth plurality of electrical conductors, and means connecting the fourth plurality of electrical conductors on the flexible sheet to the first and second plurality of electrical conductors of gas panel whereby the electrical conductors on the flexible sheet convey operating signals from the electrical components on the component board to the first and second plurality of parallel electrical conductors of the gas panel.

2. The apparatus of claim 1 further including:

additional means securing the component board and the flexible sheet together, thereby to form a compact display device.

3. The apparatus of claim 1 further including:

means for mounting the component board and the gas panel in a common plane.

4. The apparatus of claim 1 further including:

means for mounting the gas panel and the component board in separate planes with the flexible sheet extending therebetween.

5. The apparatus of claim 4 wherein apertures are provided in the flexible sheet between the component board and the gas panel to permit the flow of cooling air therethrough.

6. A display device comprising:

a gas panel, including first and second transparent members with a chamber therebetween filled with an illuminable gas, a first plurality of parallel electrical conductors disposed on one side of the illuminable gas on said first transparent member, a second plurality of parallel electrical conductors disposed on the opposite side of the illuminable gas on said second transparent member, said first and second plurality of parallel electrical conductors being disposed orthogonally with respect to each other, a flexible sheet of insulation material, a plurality of electrical conductors disposed on said flexible sheet, a circuit board, electrical circuit components mounted on said circuit board, means bonding the flexible sheet to said circuit board, means interconnecting the electrical circuit components mounted on said circuit board to the electrical conductors disposed on said flexible sheet, and means connecting the conductors on flexible sheet to the first and second plurality of parallel electrical conductors of the gas panel whereby the electrical conductors on the flexible sheet convey operating signals from the electrical circuit components on the circuit board to the first and second plurality of parallel electrical conductors on the gas panel.

7. The apparatus of claim 6 wherein the flexible sheet is a polyimide film which has high heat resistence and high electrical resistence.

8. The apparatus of claim 7 wherein the gas panel and the circuit board are disposed in separate planes with the flexible sheet extending there-between.

9. The apparatus of claim 8 wherein apertures are provided in the flexible sheet between the circuit board and the gas panel to permit the flow of cooling air therethrough.

10. An electrical device including:

first and second members, electrical components and circuits disposed on said first and second members, a flexible sheet of insulation material, electrical conductors disposed on said flexible sheet, said flexible sheet extending between the first and second members, first means connecting the electrical conductors on said flexible sheet to the electrical components and circuits on said first and second members, a gas panel having a chamber filled with an illuminable gas, a first plurality of electrical conductors disposed on one side of said chamber, a second plurality of electrical conductors disposed on the opposite side of said chamber orthogonally with respect to said first plurality of electrical conductors, said flexible sheet with electrical conductors thereon extending from said first and second members to said gas panel, and second means connecting the electrical conductors on said flexible sheet to the first and second plurality of electrical conductors of the gas panel.

11. The apparatus of claim 10 further including:

means for mounting the gas panel, the first member, and the second member in a common plane.

12. The apparatus of claim 10 further including:

means for mounting the gas panel, the first member, and the second member in different planes.

13. The apparatus of claim 10 further including:

means for mounting the gas panel, the first member, and the second member in abutting relationship as a compact unit.

14. The apparatus of claim 10 wherein apertures are provided in the flexible sheet between the first and second members to permit the flow of cooling air between said first and second members.

15. The apparatus of claim 10 wherein the flexible sheet is a polyimide material which has high heat resistance and high electrical resistance.

* * * * *